Patented Apr. 29, 1924.

1,492,054

UNITED STATES PATENT OFFICE.

RICHARD TOBLER AND ROBERT STOCKER, OF BASEL, JAKOB MÜLLER, OF MÜNCHENSTEIN, NEAR BASEL, AND ARMIN BUCHER, OF BASEL, SWITZERLAND, ASSIGNORS TO SOCIETY OF CHEMICAL INDUSTRY IN BASLE, OF BASEL, SWITZERLAND.

NAPHTHTHIOINDOXYLS AND PROCESS OF MAKING SAME.

No Drawing.   Application filed November 23, 1923. Serial No. 676,670.

*To all whom it may concern:*

Be it known that we, RICHARD TOBLER and ROBERT STOCKER, both residing at Basel, Switzerland, JAKOB MÜLLER, residing at Munchenstein, near Basel, Switzerland, and ARMIN BUCHER, residing at Basel, Switzerland, all four citizens of the Swiss Republic, have invented new and useful Naphththioindoxyls and Process of Making Same, of which the following is a full, clear, and exact specification.

Our invention relates to a process for the manufacture of naphththioindoxyls which are valuable intermediate products for the production of dyestuffs. It comprises also the halogenated naphththioindoxyls.

By this invention naphththioindoxyls can be made by dissolving a thionaphthisatin compound of one of the three theoretically possible types

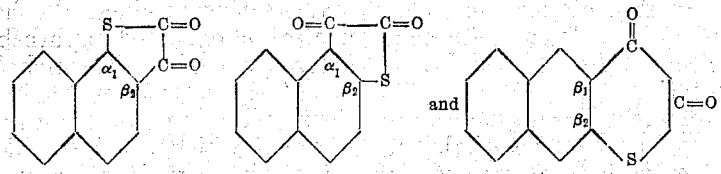

in an alkali, thereby producing the corresponding thionaphtholglyoxylic acid, converting this latter by means of a monohalogenacetic acid into the corresponding thioglycolglyoxylic acid, then converting this by elimination of carbon monoxide into the thioglycolcarboxylic acid and finally condensing the latter to the naphththioindoxyl.

By this process there may be obtained not only the known naphththioindoxyls but also hitherto unknown nucleal halogenated naphththioindoxyls. All these products form feebly colored powders which are insoluble in water but soluble in organic solvents and in caustic alkalies. They are valuable products for the manufacture of dyestuffs.

The following examples illustrate the invention, the parts being by weight.

214 parts of 1:2-thionaphthisatin are dissolved at 80° C. in a solution of sodium carbonate of 10 per cent strength. Into this reddish-yellow solution there is allowed to drop at the same temperature a solution of 104 parts of monochloracetic acid, feebly alkaline with sodium carbonate. Condensation occurs, accompanied by loss of colour. The whole is allowed to cool and acidified with dilute hydrochloric acid. The precipitate formed is filtered. The naphthalene-1-thioglycol-2-glyoxylic acid thus produced is a colourless powder which crystallizes from water in beautiful needles and melts at 171–172° C.

290 parts of it are introduced in the course of an hour into 700 parts of sulphuric acid of 90–94 per cent strength at 20–30° C. Dissolution to a dark brown solution occurs accompanied by foaming. When the elimination of carbon monoxide is complete, the mixture is introduced into water and the solid matter is filtered, washed and dried. In this manner the naphthalene-1-thioglycol-2-carboxylic acid is obtained as a white crystalline powder, which melts at 144-145° C. after being re-crystallized twice from water. A mixture of 262 parts of this carboxylic acid, 2000 parts of acetic anhydride and 5000 parts of anhydrous sodium acetate is boiled for some hours. When the mass is introduced into water there separates the acetylated 1:2-naphththioindoxyl is crystalline form. The acidyl-group is eliminated by boiling it with caustic soda solution of 10 per cent strength and the 1:2-naphththioindoxyl is precipitated by adding acid to the solution obtained. The 1:2-naphththioindoxyl can be recrystallized from dilute alcohol or light petroleum. It forms slender, nearly colourless needles which melt at 142° C.

The ring closure of naphththioindoxyl or its carboxylic acid can also be effected by means of alkalies.

In like manner there may be made, for example, from 2:1-thionaphthisatin the 2:1-naphththioindoxyl.

From 4-chloro-1:2-thionaphthisatin the 4-chloro-1:2-naphththioindoxyl of melting point 165° C.

From 5-chloro-2:1-thionaphthisatin the 5-chloro-2:1-naphththioindoxyl of melting point 146° C.

From 5-bromo-2:1-thionaphthisatin the 5-bromo-2:1-naphththioindoxyl of melting point 170° C.

From 8-chloro-2:1-thionaphthisatin the 8-chloro-2:1-naphththioindoxyl of melting point 179° C.

From 1-chloro-2:3-thionaphthisatin the 1-chloro-2:3-naphththioindoxyl, whose acetyl derivative melts at 106° C.

From 1-bromo-2:3-thionaphthisatin the 1-bromo 12:3-naphththioindoxyls of melting point 155° C.

From 7-chloro-2:1-thionaphthisatin the 7-chloro-2:1-naphththioindoxyl of melting point 155° C.

From 5-chloro-1:2-thionaphthisatin the 5-chloro-1:2-naphththioindoxyl of melting point 176° C.

What we claim is:

1. The herein described manufacture of naphththioindoxyls from thionaphthisatin compounds by successive dissolution in alkali, reaction with monohalogenacetic acid, elimination of carbon monoxide and ring closure by condensation.

2. The herein described manufacture of naphththioindoxyls from a nucleal halogen-substitution product of a thionaphthisatin, by successive dissolution in alkali, reaction with monohalogenacetic acid, elimination of carbon monoxide and ring closure by condensation.

3. The herein described manufacture of naphththioindoxyls from a nucleal halogen-substitution product of a thionaphthisatin, the heterocyclic sulfur atom of which being attached to a $\beta$-position of the naphthalene nucleus, by successive dissolution in alkali, reaction with monohalogenacetic acid, elimination of carbon monoxide and ring closure by condensation.

4. The herein described manufacture of naphththioindoxyls from a nucleal halogen-substitution product of a thionaphthisatin, the heterocyclic ring of which being attached to a $\beta_1\beta_2$-position of the naphthalene nucleus, by successive dissolution in alkali, reaction with monohalogenacetic acid, elimination of carbon monoxide and ring closure by condensation.

5. As new products the herein described nucleal halogenated naphththioindoxyls, which products form feebly colored powders which are insoluble in water but soluble in organic solvents and in caustic alkalies.

6. As new products the herein described nucleal halogenated naphththiondoxyls, the heterocyclic sulfur atom of which being attached to a $\beta$-position of the naphthalene nucleus, which products form feebly colored powders which are insoluble in water but soluble in organic solvents and in caustic alkalies.

7. As new products the herein described nucleal halogenated naphththioindoxyls, the heterocyclic ring of which being attached to a $\beta_1$-$\beta_2$-position of the naphthalene nucleus, which products form feebly colored powders which are insoluble in water but soluble in organic solvents and in caustic alkalies.

In witness whereof we have hereunto signed our names this 3rd day of November, 1923, in the presence of two subscribing witnesses.

RICHARD TOBLER.
ROBERT STOCKER.
JAKOB MÜLLER.
ARMIN BUCHER.

Witnesses:
ARMAND BRAUN,
MADELINE SPENGLER,